US009842498B2

(12) United States Patent
Wang et al.

(10) Patent No.: US 9,842,498 B2
(45) Date of Patent: Dec. 12, 2017

(54) ROAD-TRAFFIC-BASED GROUP, IDENTIFIER, AND RESOURCE SELECTION IN VEHICULAR PEER-TO-PEER NETWORKS

(75) Inventors: Ying Wang, Easton, PA (US); Xinzhou Wu, Monmouth Junction, NJ (US); Sundar Subramanian, Somerville, NJ (US); Junyi Li, Chester, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 13/323,237

(22) Filed: Dec. 12, 2011

(65) Prior Publication Data

US 2013/0013181 A1 Jan. 10, 2013

Related U.S. Application Data

(60) Provisional application No. 61/504,639, filed on Jul. 5, 2011.

(51) Int. Cl.
*G06F 19/00* (2011.01)
*G08G 1/0967* (2006.01)

(52) U.S. Cl.
CPC .............................. *G08G 1/096791* (2013.01)

(58) Field of Classification Search
CPC ........... G08G 1/0104; G08G 1/096775; G08G 1/096716; H04W 8/005; H04W 84/18
(Continued)

(56) References Cited

U.S. PATENT DOCUMENTS 6,266,608 B1 * 7/2001 Pertz ................ G08G 1/096716 340/901
6,647,268 B1 * 11/2003 Tsuchida ............... G01S 5/0072 340/988
(Continued)

FOREIGN PATENT DOCUMENTS

CN 101120612 A 2/2008
CN 101467189 A 6/2009
(Continued)

OTHER PUBLICATIONS

Min-Te Sun et al: "GPS-based message broadcast for adaptive inter-vehicle communications", Vehicular Technology Conference, 2000. IEEE VTS Fall VTC 2000. 52nd Sep. 24-28, 2000, Piscataway, NJ, USA,IEEE, vol. 6, Sep. 24, 2000 (Sep. 24, 2000), pp. 2685-2692, XP010525075, ISBN: 978-0-7803-6507-0.*
(Continued)

*Primary Examiner* — Shardul Patel
(74) *Attorney, Agent, or Firm* — Arent Fox, LLP

(57) ABSTRACT

A method, a computer program product, and an apparatus for wireless communication are provided. The apparatus adjusts a number of sets of identifiers in a plurality of sets of identifiers based on traffic information. In addition, the apparatus selects an identifier from a set of identifiers of the plurality of sets of identifiers based on the traffic information. Furthermore, the apparatus communicates using resources associated with the selected identifier. The traffic information may include at least one of direction of travel, map information, velocity, whether approaching an intersection, whether departing an intersection, location, a number of vehicles within a particular area, information from other vehicles, type of intersection, whether the intersection includes stop lights or stop signs, at least one computed
(Continued)

value based on acquired traffic information, or information from other wireless devices.

43 Claims, 10 Drawing Sheets

(58) Field of Classification Search
USPC ......... 701/119, 117, 200, 118, 400; 340/901, 340/905; 342/454, 456
See application file for complete search history.

(56) References Cited

U.S. PATENT DOCUMENTS

| | | | | |
|---|---|---|---|---|
| 7,068,600 | B2 * | 6/2006 | Cain | H04L 12/5695 370/230.1 |
| 7,720,026 | B2 | 5/2010 | Chen et al. | |
| 8,005,091 | B2 | 8/2011 | Wu et al. | |
| 8,495,232 | B2 | 7/2013 | Wu et al. | |
| 8,496,234 | B1 * | 7/2013 | Govindan | B01D 1/0058 261/117 |
| 2003/0187570 | A1 * | 10/2003 | Impson | G08G 1/096716 701/117 |
| 2006/0019698 | A1 * | 1/2006 | Ahya | H04W 48/18 455/552.1 |
| 2007/0115868 | A1 * | 5/2007 | Chen | G08G 1/163 370/315 |
| 2007/0197261 | A1 * | 8/2007 | Humbel | G06Q 30/00 455/558 |
| 2008/0150683 | A1 | 6/2008 | Mikan et al. | |
| 2009/0016219 | A1 * | 1/2009 | Laroia | H04W 72/02 370/231 |
| 2009/0017844 | A1 * | 1/2009 | Li | H04W 68/00 455/458 |
| 2009/0210495 | A1 * | 8/2009 | Wolfson | G06F 17/30566 709/205 |
| 2009/0257351 | A1 * | 10/2009 | Hande | H04L 12/5695 370/236 |
| 2010/0033347 | A1 * | 2/2010 | Hayashi | G08G 1/017 340/905 |
| 2010/0310004 | A1 * | 12/2010 | Li | H04L 27/2637 375/295 |
| 2011/0066738 | A1 | 3/2011 | Richardson et al. | |
| 2011/0133952 | A1 * | 6/2011 | McNamara | G08G 1/096716 340/905 |
| 2012/0092186 | A1 * | 4/2012 | Lai | G08G 1/161 340/905 |
| 2012/0309422 | A1 * | 12/2012 | Lewis-Evans | B60R 25/1025 455/456.1 |

FOREIGN PATENT DOCUMENTS

| | | | |
|---|---|---|---|
| CN | 101473326 | A | 7/2009 |
| CN | 101573587 | A | 11/2009 |
| JP | 2004062381 | A | 2/2004 |
| JP | 2010016493 | A | 1/2010 |
| WO | WO-2009009537 | | 1/2009 |
| WO | WO-2009009687 | | 1/2009 |
| WO | WO-2010032538 | A1 | 3/2010 |
| WO | WO-2011035340 | A1 | 3/2011 |

OTHER PUBLICATIONS

International Search Report and Written Opinion—PCT/US2012/045460—ISA/EPO —dated Oct. 15, 2012

Sun M T., et al., "GPS-based Message Broadcast for Adaptive Inter-vehicle Communications", Vehicular Technology Conference, 2000. IEEE VTS Fall VTC 2000. 52nd Sep. 24-28, 2000, Piscataway, NJ, USA,IEEE, vol. 6, Sep. 24, 2000 (Sep. 24, 2000), pp. 2685-2692, XP010525075.

* cited by examiner

ROAD-TRAFFIC-BASED GROUP, IDENTIFIER, AND RESOURCE SELECTION IN VEHICULAR PEER-TO-PEER NETWORKS

CROSS-REFERENCE TO RELATED APPLICATION(S)

This application claims the benefit of U.S. Provisional Application Ser. No. 61/504,639, entitled "ROAD-TRAFFIC-BASED GROUP, IDENTIFIER, AND RESOURCE SELECTION IN VEHICULAR PEER-TO-PEER NETWORKS," filed on Jul. 5, 2011, which is expressly incorporated by reference herein in its entirety.

BACKGROUND

Field

The present disclosure relates generally to communication systems, and more particularly, to road-traffic-based group, identifier, and resource selection in vehicular peer-to-peer networks.

Background

In vehicular networks in which wireless devices are highly mobile, there may be more frequent collisions with broadcasting and/or data traffic resources and/or conflicts when contending for data traffic resources. As such, methods are needed in vehicular networks that reduce resource collisions and contending conflicts.

SUMMARY

In an aspect of the disclosure, a method, a computer program product, and an apparatus are provided. The apparatus adjusts a number of sets of identifiers in a plurality of sets of identifiers based on traffic information. In addition, the apparatus selects an identifier from a set of identifiers of the plurality of sets of identifiers based on the traffic information. Furthermore, the apparatus communicates using resources associated with the selected identifier.

DETAILED DESCRIPTION

Figure 1:
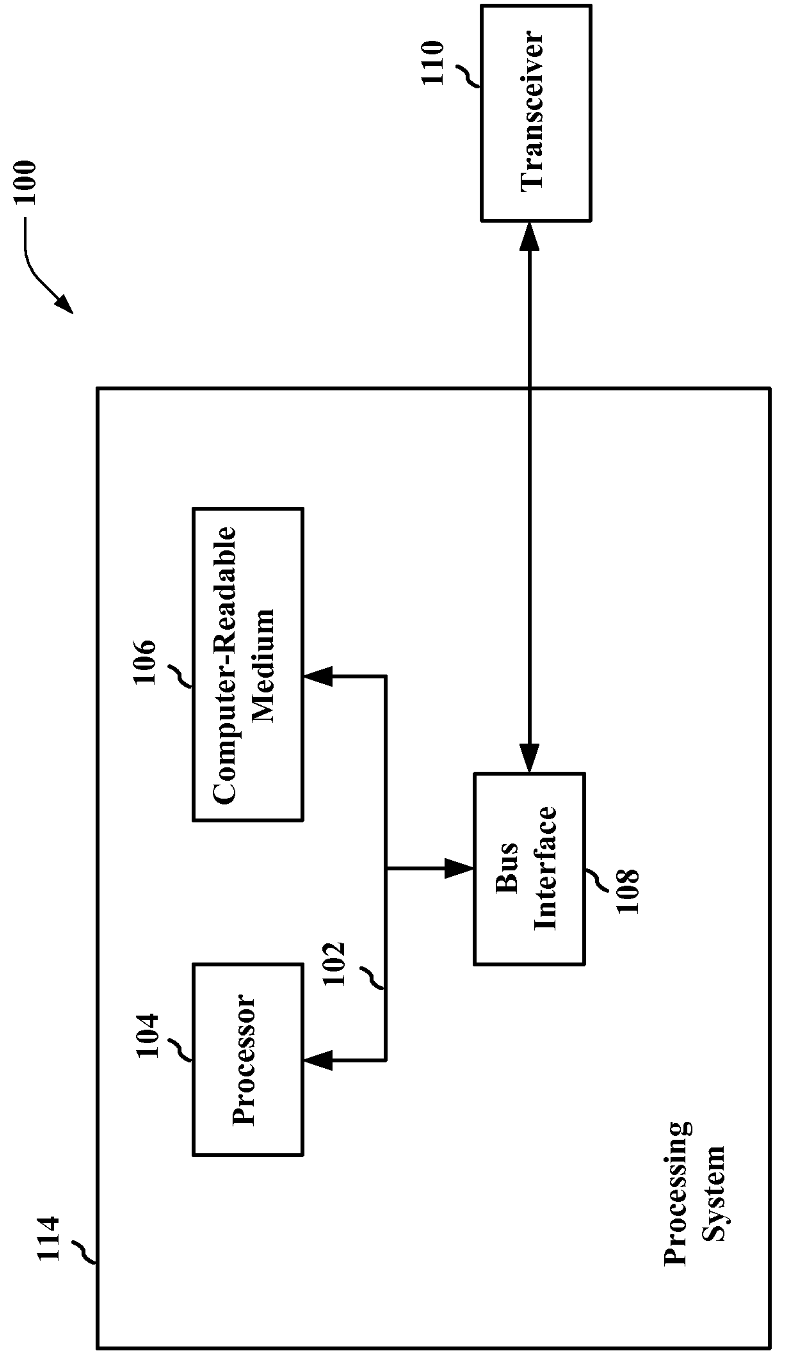
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
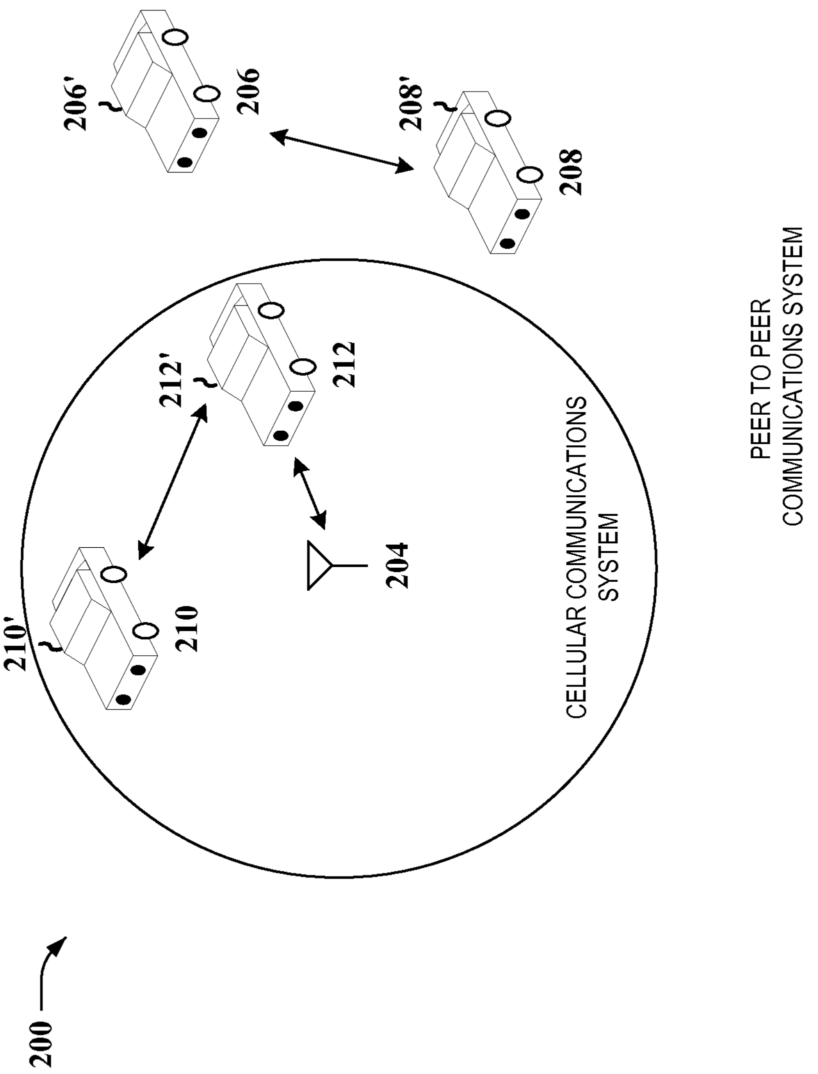
FIG. 2 is a drawing of a wireless peer-to-peer communications system.

FIG. 2 is a drawing of an exemplary peer-to-peer communications system 200. The peer-to-peer communications system 200 includes vehicles 206', 208', 210', 212' equipped with wireless devices 206, 208, 210, 212, respectively. The peer-to-peer (or vehicle-to-vehicle) communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The vehicles 206', 208', 210', 212' are each equipped with a wireless device 206, 208, 210, 212, respectively. The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, VLinQ, WiMedia, Bluetooth, ZigBee, or Wi-Fi based on the IEEE 802.11 standard. To simplify the discussion, the exemplary methods and apparatus may be discussed within the context of VLinQ. However, one of ordinary skill in the art would understand that the exemplary methods and apparatuses are applicable more generally to a variety of other wireless peer-to-peer communication systems.

Figure 3:
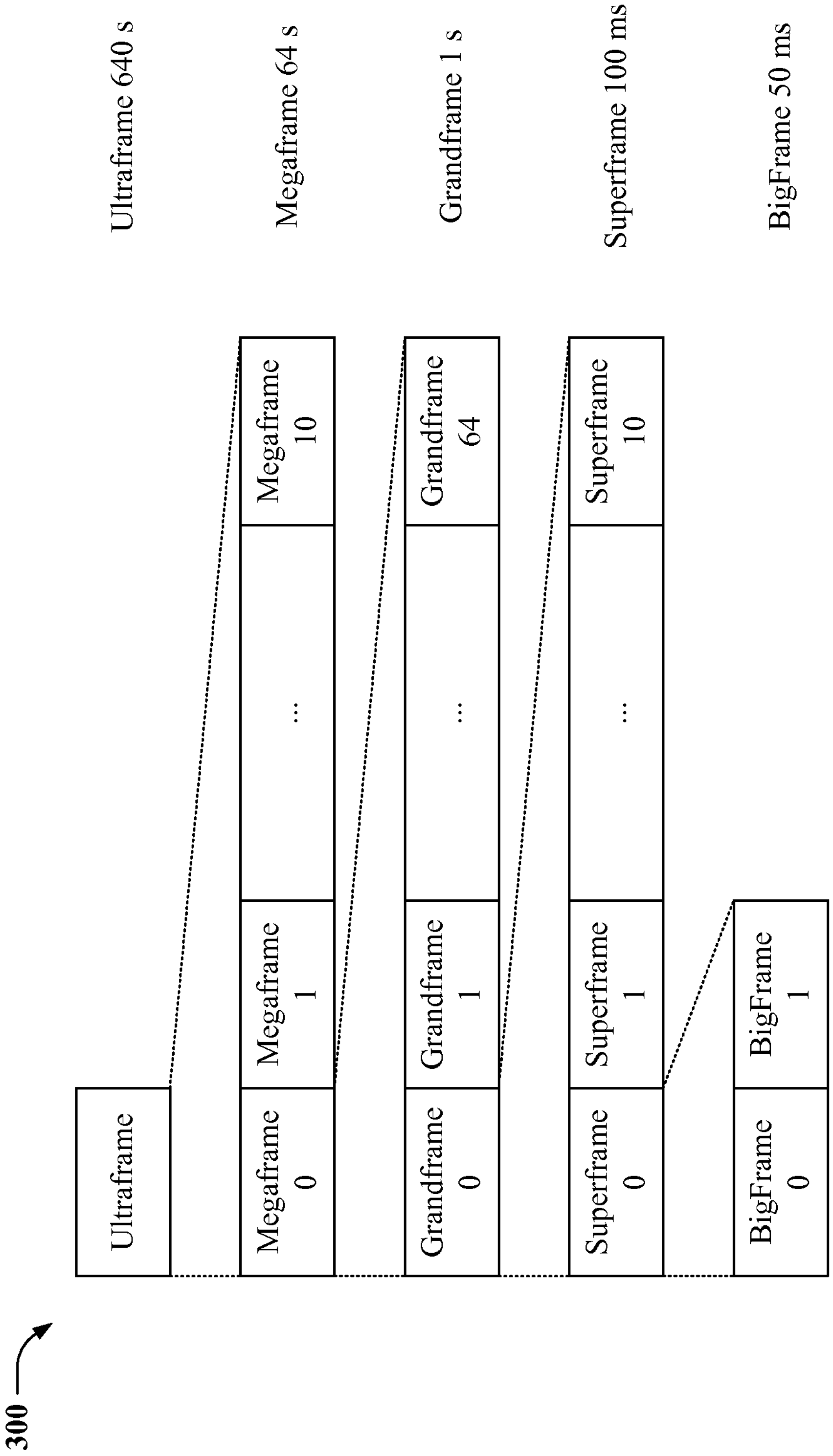
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 640 seconds and includes ten megaframes. Each megaframe is 64 seconds and includes 64 grandframes. Each grandframe is one second and includes ten superframes. Each superframe is 100 ms and includes two bigframes. Each bigframe is 50 ms. A bigframe may also be referred to as a frame.

Figure 4:
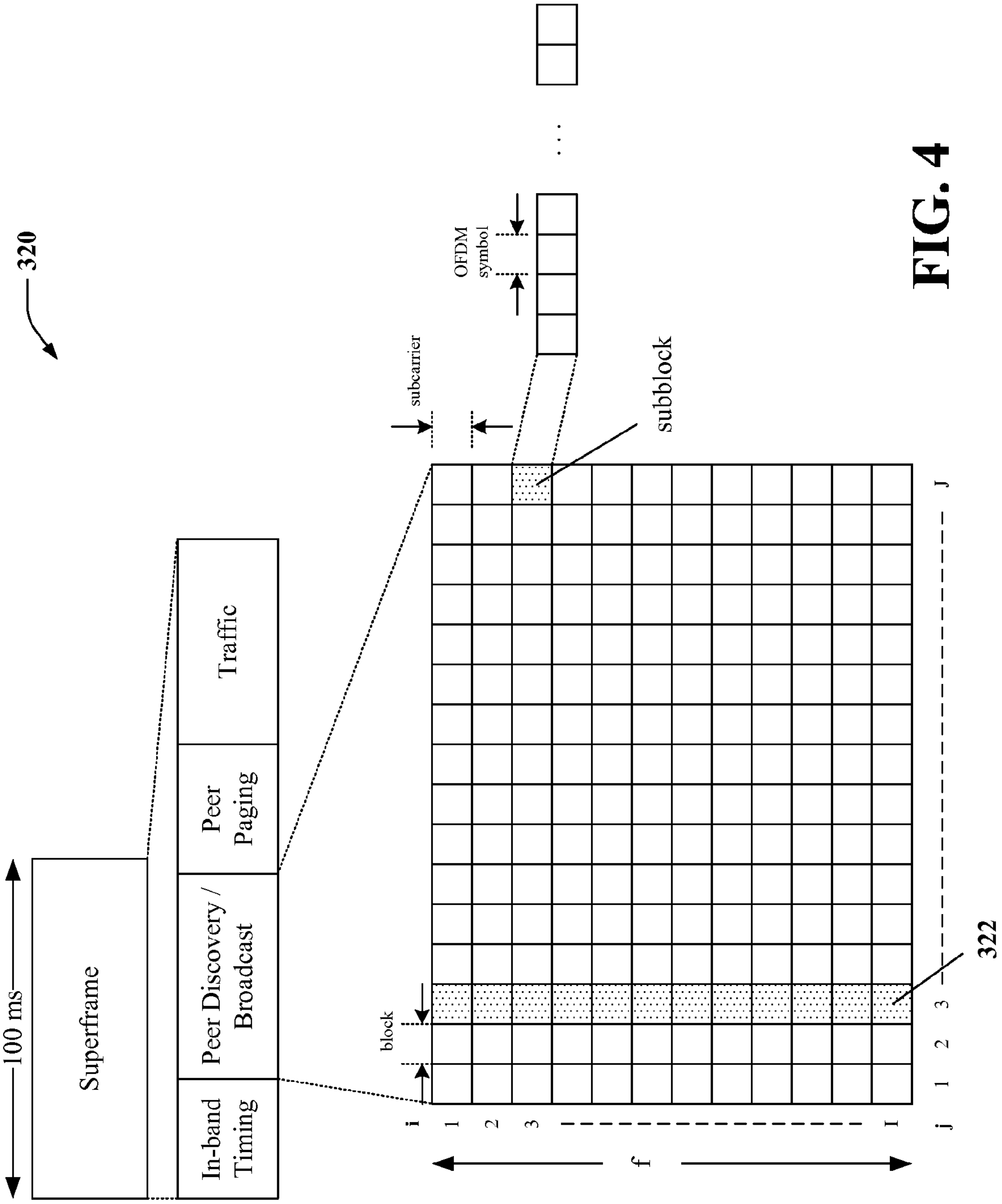
FIG. 4 is a diagram illustrating an operation timeline of a superframe and a structure of a peer discovery/broadcast channel.

FIG. 4 is a diagram 320 illustrating an operation timeline of a superframe and an exemplary structure of a peer discovery/broadcast channel. The superframe includes an in-band timing channel, a peer discovery/broadcast channel, a peer paging channel, and a data traffic channel (TCCH). The peer discovery/broadcast channel may include J blocks (e.g., 75) for communicating peer discovery information. Each block may include I subblocks (e.g., 112). Each subblock may include a plurality of orthogonal frequency-division multiplexing (OFDM) symbols (e.g., 22) at the same subcarrier. Different blocks may correspond to different peer discovery resource identifiers (PDRIDs). For example, a first PDRID may correspond to the block at j=1, a second PDRID may correspond to the block at j=2, etc.

Upon power up, a wireless device listens to the peer discovery/broadcast channel for a period of time and selects a PDRID based on a determined energy on each of the PDRIDs. For example, a wireless device may select a PDRID corresponding to the block 322 at j=3. The particular PDRID may map to other blocks in other superframes due to hopping. In the block associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 5:
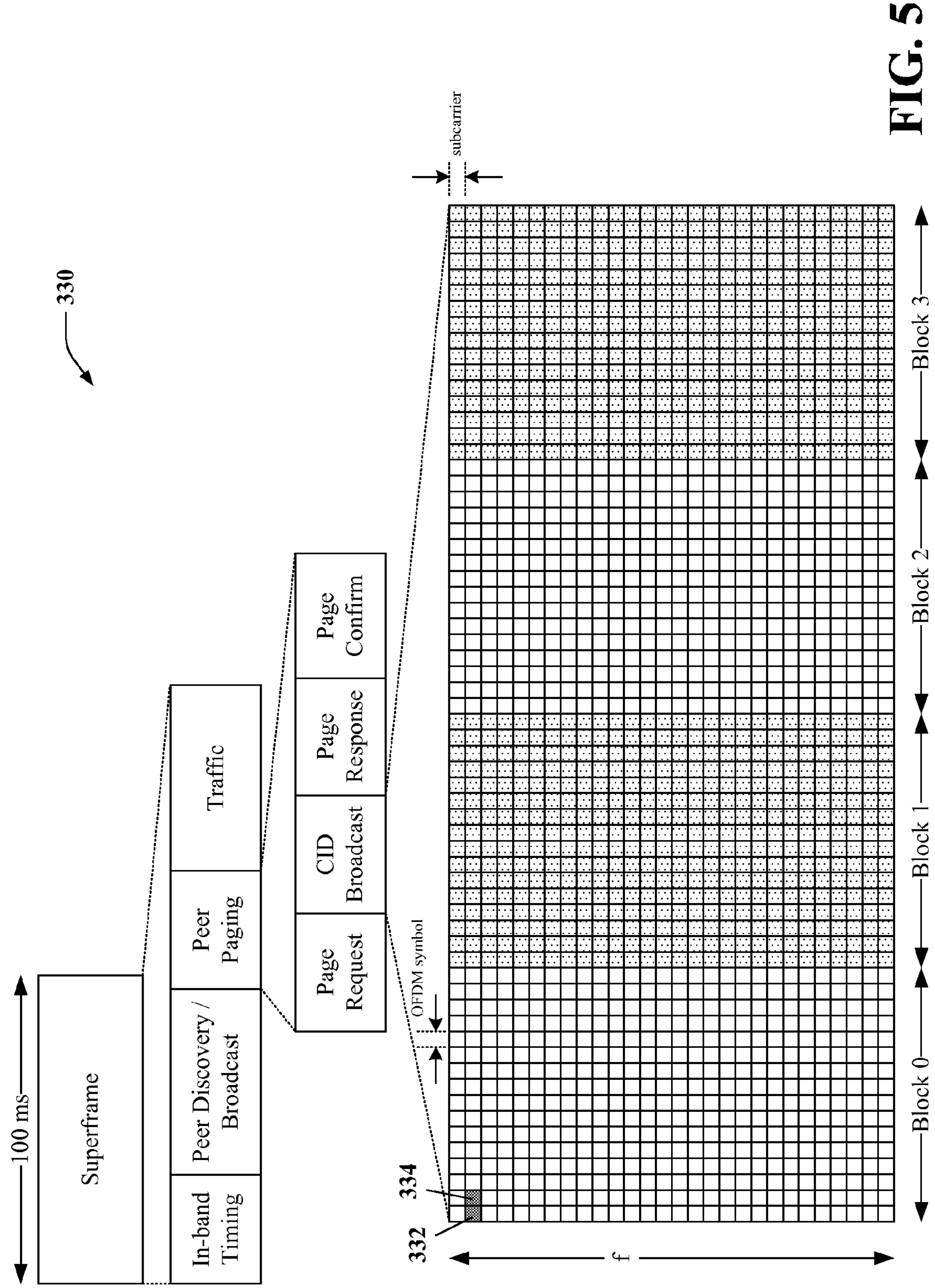
FIG. 5 is a diagram illustrating a structure of a connection identifier broadcast.

FIG. 5 is a diagram 330 illustrating a structure of a connection identifier (CID) broadcast. The peer paging channel includes a page request channel, a CID broadcast channel, a page response channel, and a page confirm channel. The CID broadcast channel provides a distributed protocol for CID allocations for new connections, provides a mechanism for CID collision detection, and provides a wireless device evidence that its link connection with a communication peer still exists. The CID defines a link between two wireless devices in peer-to-peer communication and defines data traffic resources that can be utilized for the peer-to-peer communication.

The structure of the CID broadcast may include four blocks, each of which contains a plurality of resource elements, i.e., a plurality of subcarriers in the frequency domain and OFDM symbols in the time domain. Each of the four blocks may span a plurality of subcarriers (e.g., 28 subcarriers) and include 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each superframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

In vehicular networks, wireless devices may periodically transmit safety-related messages through the peer discovery/broadcast channel. Based on the selected PDRID, periodic and dedicated broadcasting resources may be allocated for the messages to ensure that every wireless device can access the peer discovery/broadcast channel with guaranteed finite delays. When selecting its broadcasting resource (or associated PDRID), a wireless device should try to avoid sharing the same broadcasting resource with other wireless devices within radio vicinity in order to minimize the interference between transmitting wireless devices. However, in a high-mobility environment such as a vehicular network, a wireless device is often moving from one place to another quickly. Staying in the same broadcasting resource may result in frequent broadcast signal collisions with other wireless devices, as there are only a finite number of PDRIDs.

Similarly, wireless devices in a high-mobility peer-to-peer communications link with an assigned CID may encounter frequent data traffic signal collisions, as there are only a finite number of CIDs. In addition, links may encounter scheduling conflicts with higher priority links when contending for the data traffic resources and yield transmissions to the higher priority links. Yielding transmissions may result in the so called "cascade yielding problem" in which wireless devices A and C can transmit concurrently without interfering with each other, but wireless device C yields a transmission to wireless device B, and wireless device B yields a transmission to wireless device A, thus resulting in only wireless device A transmitting in a particular frame. As such, the cascade yielding problem leads to inefficient use of the data traffic resources. Methods for selecting the PDRID and/or the CID or otherwise the resources for transmitting broadcast information and/or communicating traffic information for improving the use of such resources are provided infra.

Figure 6:
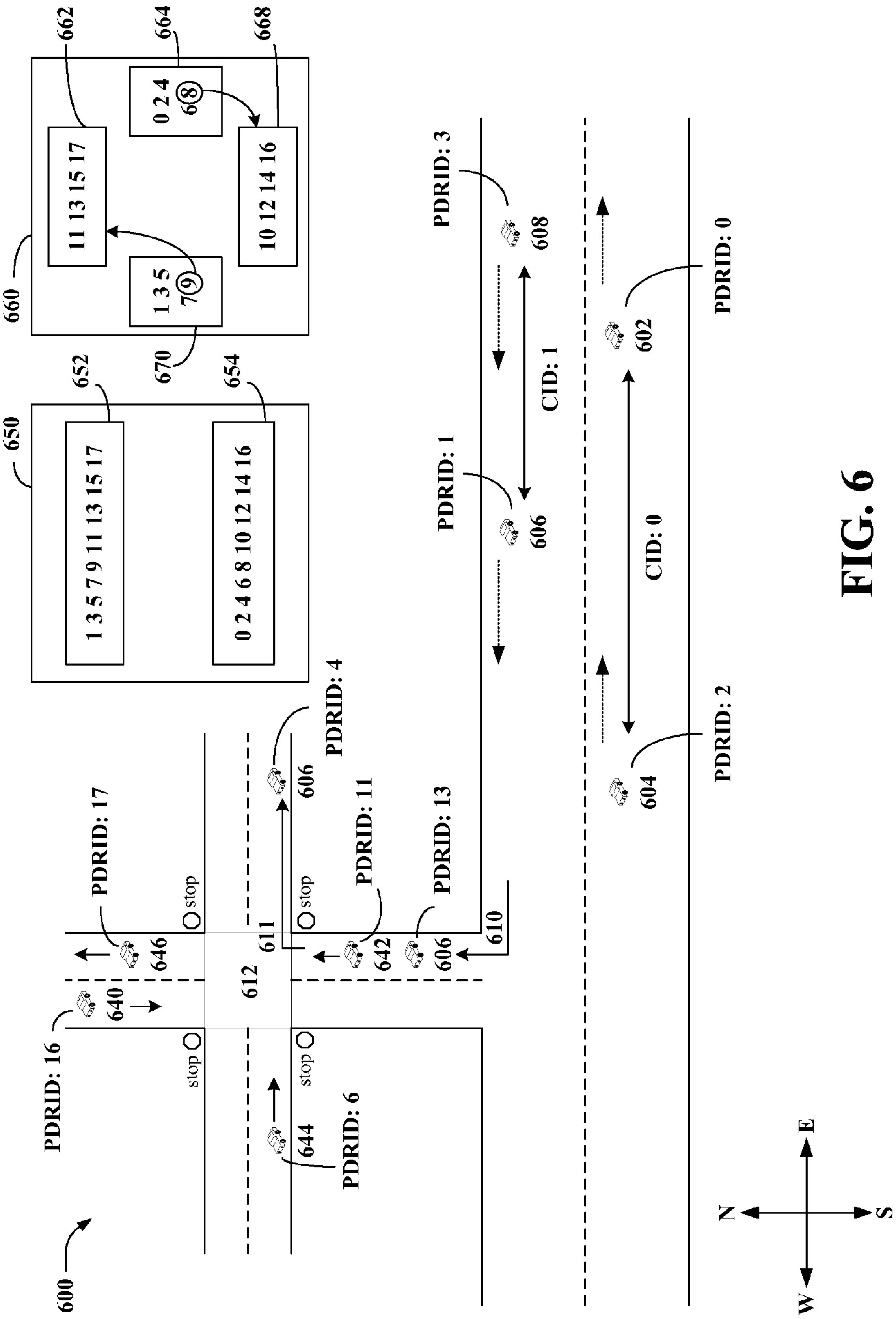
FIG. 6 is a diagram for illustrating an exemplary method.

FIG. 6 is a diagram 600 for illustrating an exemplary method. As shown in FIG. 6, the wireless devices 602, 604 (shown as vehicles) are traveling eastbound and the wireless devices 606, 608 (shown as vehicles) are traveling westbound. The wireless devices 602-608 each select a PDRID from a plurality of sets of identifiers 650. The sets of identifiers 650 includes a first set of identifiers 652 reserved for westbound traffic and a second set of identifiers 654 reserved for eastbound traffic. The wireless device 602 selects the PDRID 0 from the second set of identifiers 654 reserved for eastbound traffic. The wireless device 604 selects the PDRID 2 from the second set of identifiers 654 reserved for eastbound traffic. The wireless device 606 selects the PDRID 1 from the first set of identifiers 652 reserved for westbound traffic. The wireless device 608 selects the PDRID 3 from the first set of identifiers 652 reserved for westbound traffic. Each of the wireless devices 602-608 transmit its peer discovery signal based on their respective PDRID, as discussed supra in relation to FIG. 4. Because a particular wireless device will pass less vehicles going the same direction than vehicles going the opposite direction, the eastbound and westbound wireless devices reduce potential PDRID collisions by selecting their PDRID from sets of PDRIDs associated with the direction of travel. More specifically, a particular wireless device will encounter many more wireless devices going in a different direction of travel than the same direction of travel, and therefore by selecting a PDRID from a set of PDRIDS associated with the direction of travel, the particular wireless device avoids collisions with wireless devices going in different directions of travel and ultimately reduces a likelihood of PDRID collisions.

As shown in FIG. 6, at some point, the wireless device 606 makes a right turn 610 to head north into an area with multi-way traffic. Upon entering an area with multi-way traffic, the wireless device 606 adjusts a number of sets of identifiers in the plurality of sets of identifiers 650/660. For example, the wireless device 606 may adjust the number of sets of identifiers from two (652, 654) to four, including a northbound set of identifiers 662, an eastbound set of identifiers 664, a southbound set of identifiers 668, and a westbound set of identifiers 670. Because the wireless device 606 is heading northbound, the wireless device 606 may select the PDRID 13 from the northbound set of identifiers 662. After selecting the PDRID 13, the wireless device 606 broadcasts its peer discovery signal using resources associated with the selected PDRID. By increasing the number of sets of identifiers in the area with multi-way traffic into a northbound set of identifiers 662, an eastbound set of identifiers 664, a southbound set of identifiers 668, and a westbound set of identifiers 670, and by selecting an identifier from the northbound set of identifiers 662 (assuming the wireless devices 640, 642, 644, 646 do the same), the wireless device 606 reduces a likelihood of PDRID collisions, as the wireless device 606 is more likely to have PDRID collisions with wireless devices moving in different directions of travel.

A similar method may apply with respect to the CID. The CID may be associated with a plurality of predetermined unicast resources for peer-to-peer communication. The wireless devices 606, 608 are in a peer-to-peer communication link and selected CID 1 from a set of odd identifiers. The wireless devices 602, 604 are in a peer-to-peer communication link and selected CID 0 from a set of even identifiers. The eastbound and westbound links reduce potential CID collisions by selecting their CID from sets of CIDs associated with the direction of travel. After the wireless device 606 makes the right turn 610, the wireless device 606 may enter into a peer-to-peer communication link with the wireless device 642. Upon entering the multi-way traffic area, the wireless device 606 may adjust a number of sets of identifiers for the CID, select an identifier from one of the adjusted number of sets of identifiers for the CID, and communicate with the wireless device 642 based on the selected CID.

An example of adjusting a number of sets of identifiers based on directions of travel in a particular area or on directions of travel of wireless devices within a particular area is provided with respect to FIG. 6. In general, the wireless device 606 may adjust the number of sets of identifiers (PDRIDs, CIDs, and/or or other identifiers associated with resources) based on traffic information. The traffic information includes at least one of directions of travel of wireless devices in an area, directions of travel available in an area, map information, velocity, whether approaching an intersection, whether departing an intersection, location, a number of vehicles within a particular area, information from other vehicles, type of intersection, whether the intersection includes stop lights or stop signs, at least one computed value based on acquired traffic information, information from other wireless devices, or other traffic related information. For example, after making the right turn 610, the wireless device 606 may keep the number of sets of identifiers at two, with a northbound set of identifiers and a southbound set of identifiers, and wait to adjust the number of sets of identifiers to four upon approaching the intersection 612. Upon making another right turn 611 and leaving the intersection 612, the wireless device 606 may again adjust the number of sets of identifiers from four to two, with an eastbound set of identifiers 654 and a westbound set of identifiers 652.

The traffic information may include multiple types of traffic information, such as for example, direction of travel and velocity. In such a configuration, the PDRIDs/CIDs may be split into sets based on direction of travel, and further divided into subsets based on velocity. Wireless devices and/or links may then select a set from a plurality of sets of identifiers based on its direction of travel, select a subset from a plurality of subsets of identifiers in the selected set, and select an identifier from the selected subset. For example, eastbound wireless devices that travel at a velocity less than 45 mph may select even PDRIDs from a first subset of even PDRIDs and wireless devices that travel at a velocity greater than 45 mph may select even PDRIDs from a second subset of even PDRIDs that are different from the first subset of even PDRIDs.

The sets of identifiers 652, 654 each contain different identifiers and are therefore orthogonal to each other (i.e., no common identifiers between the sets). Further, the sets of identifiers 662, 664, 668, 670 each contain different identifiers and are therefore orthogonal to each other. Based on the traffic information, the wireless device 606 may also adjust a size of at least two of the sets of identifiers. For example, upon making the right turn 611, the wireless device 606 may determine that there is more traffic going northbound/southbound than eastbound/westbound. That is, the wireless device 606 may receive information from the wireless devices 640, 642, 644, 646 indicating their direction of travel. The wireless device 606 may then determine that there are three wireless devices (640, 642, 646) heading northbound/southbound and two wireless devices (644, 606) heading eastbound/westbound. Accordingly, the wireless device 606 may move/shift the PDRID 8 from the eastbound set of identifiers 664 to the southbound set of identifiers 668 and move/shift the PDRID 9 from the westbound set of identifiers 670 to the northbound set of identifiers 662. As such, the northbound/southbound sets of identifiers 662, 668 would each have five PDRIDs and the westbound/eastbound sets of identifiers 670, 664 would each have four PDRIDs. After adjusting a size of the sets of identifiers, the wireless device 606 selects its PDRID from a smaller eastbound set of identifiers 664, selecting PDRID 4. By changing a size of at least two of the sets of identifiers (assuming other wireless devices in the area do the same), the northbound/southbound wireless devices are less likely to have PDRID collisions among themselves.

Generally, the wireless device 606 categorizes the traffic information of a particular type of traffic information into a number of categories, and adjusts the number of sets of identifiers by decreasing a number of sets of identifiers in the plurality of sets of identifiers and increasing a size of each of the plurality of sets of identifiers when the number of categories decreases, and by increasing the number of sets of identifiers in the plurality of sets of identifiers and decreasing a size of each of the plurality of sets of identifiers when the number of categories increases. For example, assume the traffic information includes possible directions of travel of wireless devices in a particular area. When the wireless device 606 travels in an area with only eastbound/westbound traffic, the wireless device 606 selects its PDRID from two sets of identifiers 652, 654, each with nine identifiers. However, after making a right turn 610 and/or approaching the intersection 612, the wireless device 606 increases the number of sets of identifiers to four, with a northbound set of identifiers 662, an eastbound set of identifiers 664, a southbound set of identifiers 668, and a westbound set of identifiers 670. The northbound/southbound sets of identifiers 662, 668 each have four identifiers and the eastbound/westbound set of identifiers 664, 670 each have five identifiers.

After adjusting the number of sets of identifiers and categorizing each of the sets of identifiers, the wireless device 606 determines a traffic parameter associated with the traffic information, and selects an identifier from one of the categories based on the traffic parameter. For example, assume the wireless device 606 categorizes the sets of identifiers into a northbound set of identifiers 662, an eastbound set of identifiers 664, a southbound set of identifiers 668, and a westbound set of identifiers 670. Assume also that the traffic parameter is its own direction of travel. When the wireless device 606 determines that it is heading northbound, the wireless device 606 selects an identifier from the northbound set of identifiers 662. For another example, the wireless device 606 may categorize the sets of identifiers into a first set of identifiers associated with a range of directions of travel between northbound and eastbound, a second set of identifiers associated with a range of directions of travel between eastbound and southbound, a third set of identifiers associated with a range of directions of travel between southbound and westbound, and a fourth set of identifiers associated with a range of directions of travel between westbound and northbound. The wireless device 606 may determine it is heading northeast and therefore that its traffic parameter is northeast. Because the traffic parameter northeast is contained in a set of traffic information that includes a range of directions of travel between northbound and eastbound, the wireless device 606 selects an identifier from the first set of identifiers. If the wireless device 606 makes a u-turn and heads southwest, because the traffic parameter southwest is contained in a set of traffic information that includes a range of directions of travel between southbound and westbound, the wireless device reselects an identifier from the third set of identifiers.

After making the u-turn, the wireless device 606 may refrain from reselecting the identifier for a time period and the time period itself may be based on the traffic information. If the wireless device 606 makes a u-turn to head southwest, and another turn immediately afterward to head eastbound, and the wireless device 606 immediately reselects its identifier, the repeated reselection may cause inefficiency associated with the reselection and use of the associated resources. As such, the wireless device 606 may wait for a time period until a direction of travel of the wireless device 606 is stable before reselecting an identifier based on the direction of travel. Further, the time period itself may be variable and may be based on the type of traffic information the wireless device 606 uses to determine how to adjust a number of the sets of identifiers.

Figure 7:
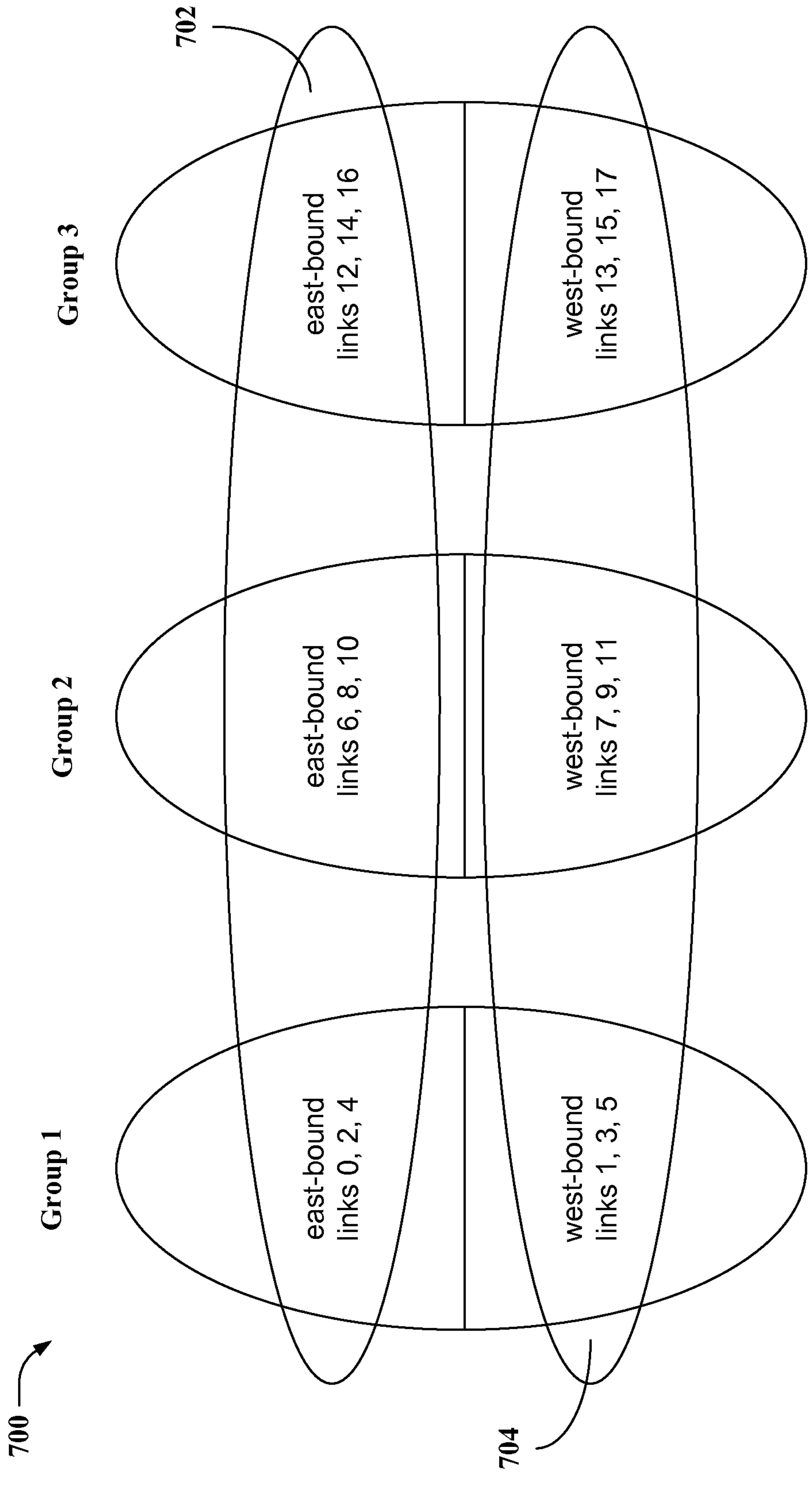
FIG. 7 is a diagram for illustrating another exemplary method.

FIG. 7 is a diagram 700 for illustrating another exemplary method. According to the method, because links traveling in the same direction may stay together for a longer period of time, they are scattered into different groups according to certain criteria. As shown in FIG. 7, the first set of identifiers 702 (e.g., even identifiers) and the second set of identifiers 704 (e.g., odd identifiers) may include a plurality of groups of identifiers. In addition, each group of identifiers may include a subset of identifiers from the first set of identifiers 702 and a subset of identifiers from the second set of identifiers 704. For example, as shown in FIG. 7, a group 1, a group 2, and a group 3 may be defined such that group 1 includes the subset of identifiers 0, 2, 4 from the first set of even identifiers 702 associated with a generally eastbound direction of travel and the subset of identifiers 1, 3, 5 from the second set of odd identifiers 704 associated with a generally westbound direction of travel; group 2 includes the subset of identifiers 6, 8, 10 from the first set of even identifiers 702 associated with a generally eastbound direction of travel and the subset of identifiers 7, 9, 11 from the second set of odd identifiers 704 associated with a generally westbound direction of travel; and group 3 includes the subset of identifiers 12, 14, 16 from the first set of even identifiers 702 associated with a generally eastbound direction of travel and the subset of identifiers 13, 15, 17 from the second set of odd identifiers 704 associated with a generally westbound direction of travel. Each group of identifiers may be associated with priorities that are either greater than or less than priorities of any other group of identifiers. For example, in a first superframe, identifiers in group 1 may have higher priorities than identifiers in group 2, and identifiers in group 2 may have higher priorities than identifiers in group 3. However, in a second superframe, identifiers in group 2 may have higher priorities than identifiers in group 1, and identifiers in group 1 may have higher priorities than identifiers in group 3. By distributing the priorities between the eastbound and westbound traveling links, the cascade yielding problem will be reduced, as the cascade yielding problem is strongest among links traveling in the same direction.

Figure 8:
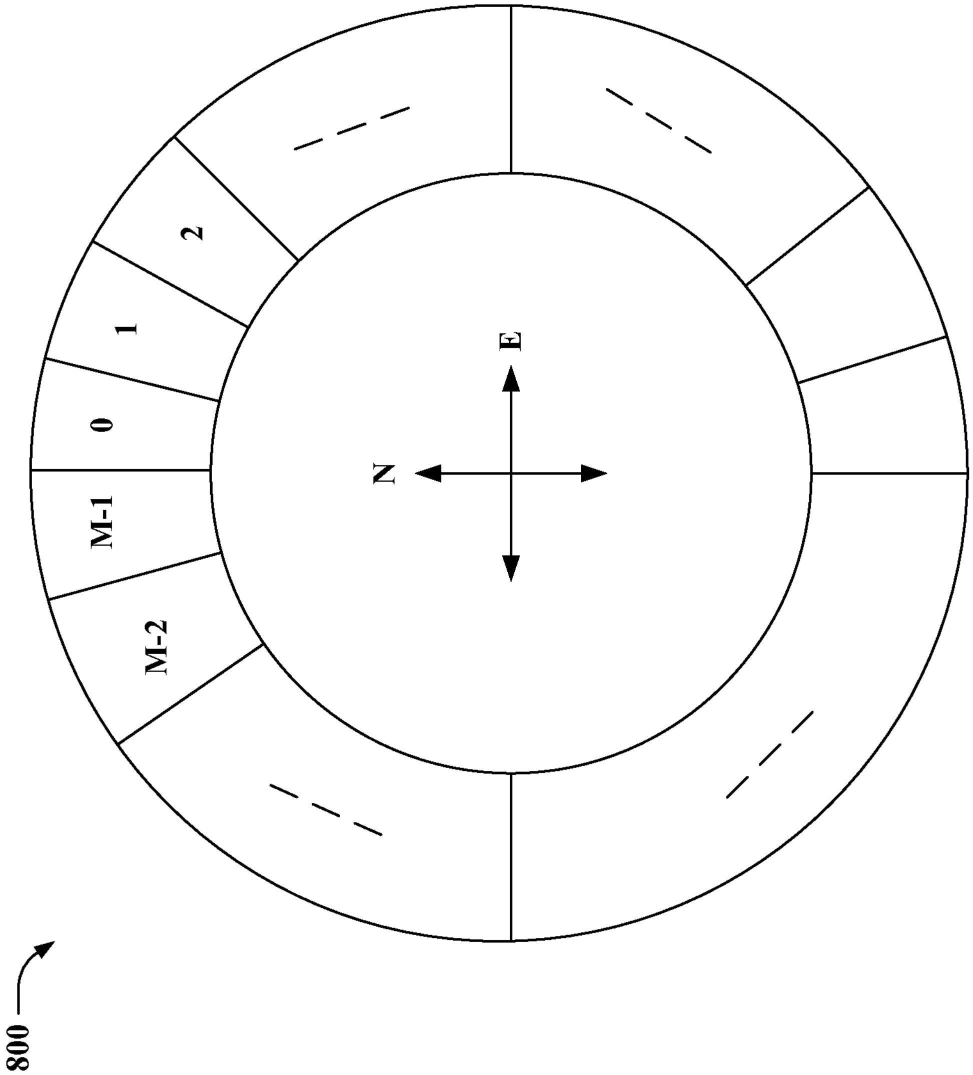
FIG. 8 is a diagram for illustrating yet another exemplary method.

FIG. 8 is a diagram 800 for illustrating yet another exemplary method. As discussed supra, the broadcast resource selection mechanism takes into account the road traffic patterns of the moving wireless devices, such as traffic direction and speed. Global Positioning System (GPS) information and readings directly from vehicles can be used to determine some of the traffic information. For example, assume there are M broadcast slots. On a two-way highway, the wireless devices traveling eastbound together can form a relative stable group and bias their selection to slots with smaller indexes, such as for example, 0-M/2−1, and the westbound wireless devices can bias their selection to slots with larger indexes, M/2-M−1. Further, the wireless devices on the passing lane may bias their selections to the smaller indexes in their respective group (0-M/4−1 for eastbound, or M/2-3M/4−1 for westbound).

In another example, assume a multi-directional traffic pattern in which wireless devices are heading various directions from one intersecting place or heading for the intersection from various directions. As shown in FIG. 8, the slot selection bias can be more continuous in a tail-biting fashion. When near to the intersection, wireless devices heading north can bias their selection to M±M/8 modulo M; the wireless devices heading west can bias their selection to 5M/8-7M/8; so on and so forth. Based on the traffic information that wireless devices gather through received broadcasts, wireless devices can predict the future traffic characteristics. When the wireless devices head out farther away from the intersection, wireless devices can start to relax the restriction of their bias, and therefore the northbound nodes can gradually make their selection M±M/4 modulo M, while the southbound nodes can gradually make their selection M/4-3M/4.

Accordingly, a wireless device may adjust a number of sets of identifiers in the plurality of sets of identifiers and a size of each of the plurality of sets of identifiers based on the traffic information. As discussed supra, the wireless device may categorize the traffic information of a particular type of traffic information into a number of categories. The wireless device may adjust the number and size by decreasing a number of sets of identifiers in the plurality of sets of identifiers and increasing a size of each of the plurality of sets of identifiers when the number of categories decreases, and by increasing the number of sets of identifiers in the plurality of sets of identifiers and decreasing a size of each of the plurality of sets of identifiers when the number of categories increases.

An example of adjusting the number and size of the sets of identifiers in which the traffic information includes whether the wireless device is approaching or leaving an intersection and directions of travel from other wireless devices was provided supra in relation to FIG. 6. For another example, assume the traffic information includes velocity of the wireless devices in its vicinity. The wireless device may categorize the velocity into categories 0-50 mph, 50-70 mph, and >70 mph. The wireless device may associate identifiers 0-5 with the 0-50 mph category, identifiers 6-11 with the 50-70 mph category, and identifiers 12-17 with the >70 mph category. Based on new traffic information, the wireless device may then re-categorize the velocity into categories 0-60 mph and >60 mph. The wireless device may then associate identifiers 0-8 with the 0-60 mph category and identifiers 9-17 with the >60 mph category. When re-categorizing, the wireless device adjusted a number of sets of identifiers in the plurality of sets of identifiers and a size of each of the plurality of sets of identifiers by decreasing a number of sets of identifiers in the plurality of sets of identifiers and increasing a size of each of the plurality of sets of identifiers when the number of categories decreased, and by increasing the number of sets of identifiers in the plurality of sets of identifiers and decreasing a size of each of the plurality of sets of identifiers when the number of categories increased.

Figure 9:
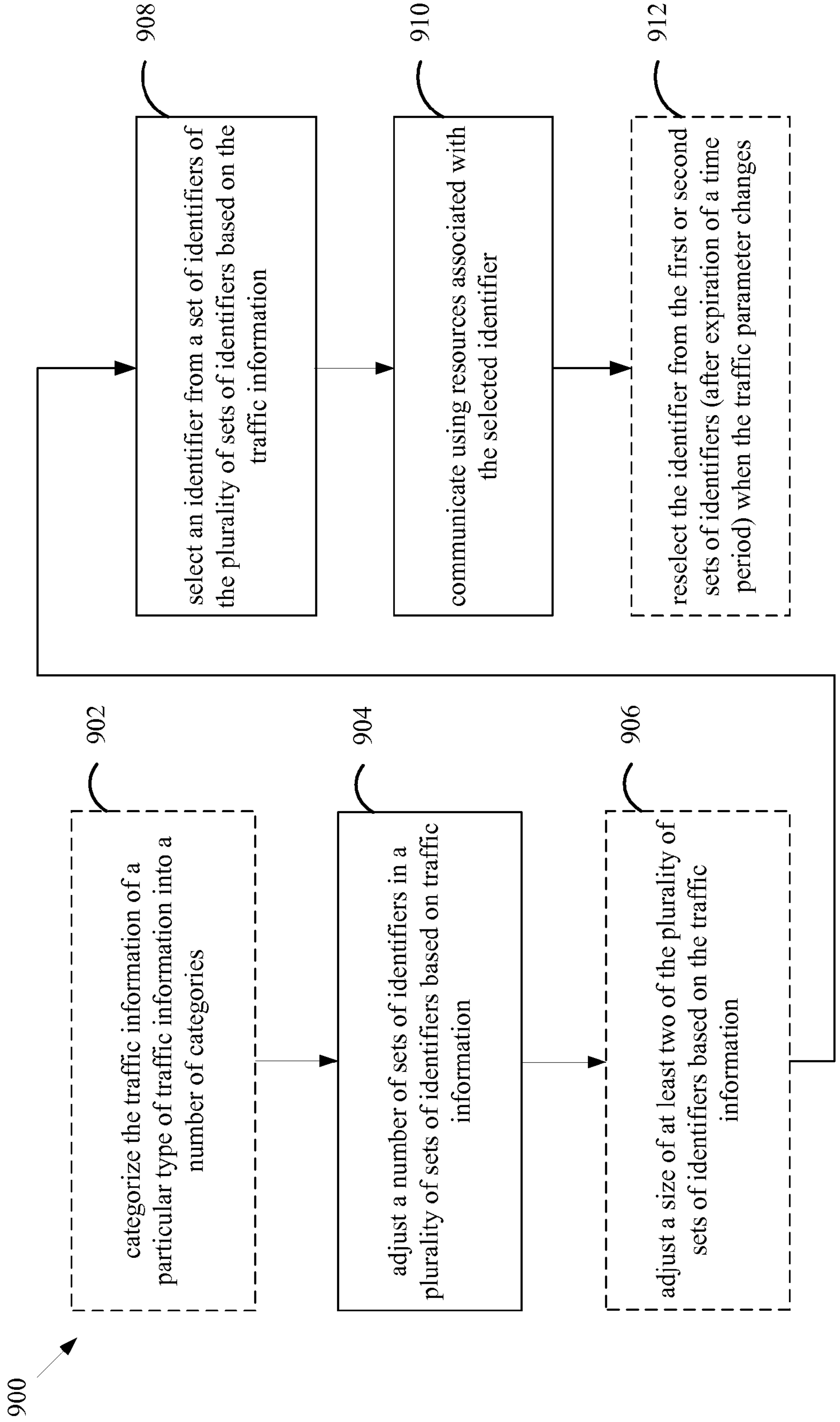
FIG. 9 is a flow chart of a method of wireless communication.

FIG. 9 is a flow chart 900 of a method of wireless communication. The method may be performed by a wireless device. Steps shown with dotted lines may be performed in additional embodiments. As shown in FIG. 9, the wireless device may categorize the traffic information of a particular type of traffic information into a number of categories (902). For example, if the traffic information includes directions of travel of other wireless device, the wireless device may categorize the directions of travel of the other wireless devices into four different categories, such as eastbound, southbound, westbound, and northbound. For another example, if the traffic information also includes velocity, the wireless device may form eight categories including eastbound and velocity <45 mph, eastbound and velocity ≥45 mph, southbound and velocity <45 mph, southbound and velocity ≥45 mph, westbound and velocity <45 mph, westbound and velocity ≥45 mph, northbound and velocity <45 mph, and northbound and velocity ≥45 mph.

The wireless device adjusts a number of sets of identifiers in a plurality of sets of identifiers based on traffic information (904). For example, the wireless device may adjust the number of sets of identifiers to the number of formed categories. When the number of categories changes, such as when the wireless device leaves an area with four-way traffic and enters an area with two-way traffic only or the wireless device determines that other wireless devices are traveling only in two general directions, the wireless device may decrease the number of sets of identifiers.

The wireless device may also adjust a size of at least two of the plurality of sets of identifiers based on the traffic information (906). For example, if the wireless device determines on a two-way road that more devices are heading eastbound than westbound, the wireless device may increase a size of an eastbound set of identifiers by moving some identifiers in a westbound set of identifiers to the eastbound set of identifiers. The wireless device selects an identifier from a set of identifiers of the plurality of sets of identifiers based on the traffic information (908). The wireless device communicates using resources associated with the selected identifier (910).

The traffic information may include at least one of directions of travel of wireless devices in an area, directions of travel available in an area, map information, velocity, whether approaching an intersection, whether departing an intersection, location, a number of vehicles within a particular area, information from other vehicles, type of intersection, whether the intersection includes stop lights or stop signs, at least one computed value based on acquired traffic information, information from other wireless devices, or other traffic related information. The at least one computed value may be a weighted function of two or more traffic parameters. The traffic information may include other traffic related information, such as for example, whether a particular area is under construction or whether there are slower speeds due to vehicle accidents.

Each of the sets of identifiers contains different identifiers, and therefore the identifiers are orthogonal to each other. The wireless device may select the identifier by selecting the identifier from a first set of identifiers when a traffic parameter associated with the traffic information is contained in a first set of traffic information, and by selecting the identifier from a second set of identifiers when a traffic parameter associated with the traffic information is contained in a second set of traffic information. For example, assume the first set of identifiers is associated with a first set of traffic information that includes directions of travel generally eastbound, between northbound and southbound, and the second set of identifiers is associated with a second set of traffic information that includes directions of travel generally westbound, between northbound and southbound. If the wireless device is heading northwest, its traffic parameter would be northwest, and because northwest is contained in the second set of traffic information (i.e., directions of travel generally westbound, between northbound and southbound), the wireless device selects its identifier from the second set of identifiers.

The wireless device may reselect the identifier from the first set of identifiers when the traffic parameter changes from being contained in the second set of traffic information to the first set of traffic information, and may reselect the identifier from the second set of identifiers when the traffic parameter changes from being contained in the first set of traffic information to the second set of traffic information (912). For example, if the wireless device turns to head northeast, its traffic parameter is northeast, which is contained in the first set of traffic information (i.e., directions of travel generally eastbound, between northbound and southbound), and therefore the wireless device reselects its identifier from the first set of identifiers. To avoid frequency changes of the identifier, the wireless device may refrain from reselecting the identifier for a time period when the traffic parameter changes from being contained in the first set of traffic information to the second set of traffic information or changes from being contained in the second set of traffic information to the first set of traffic information.

Figure 10:
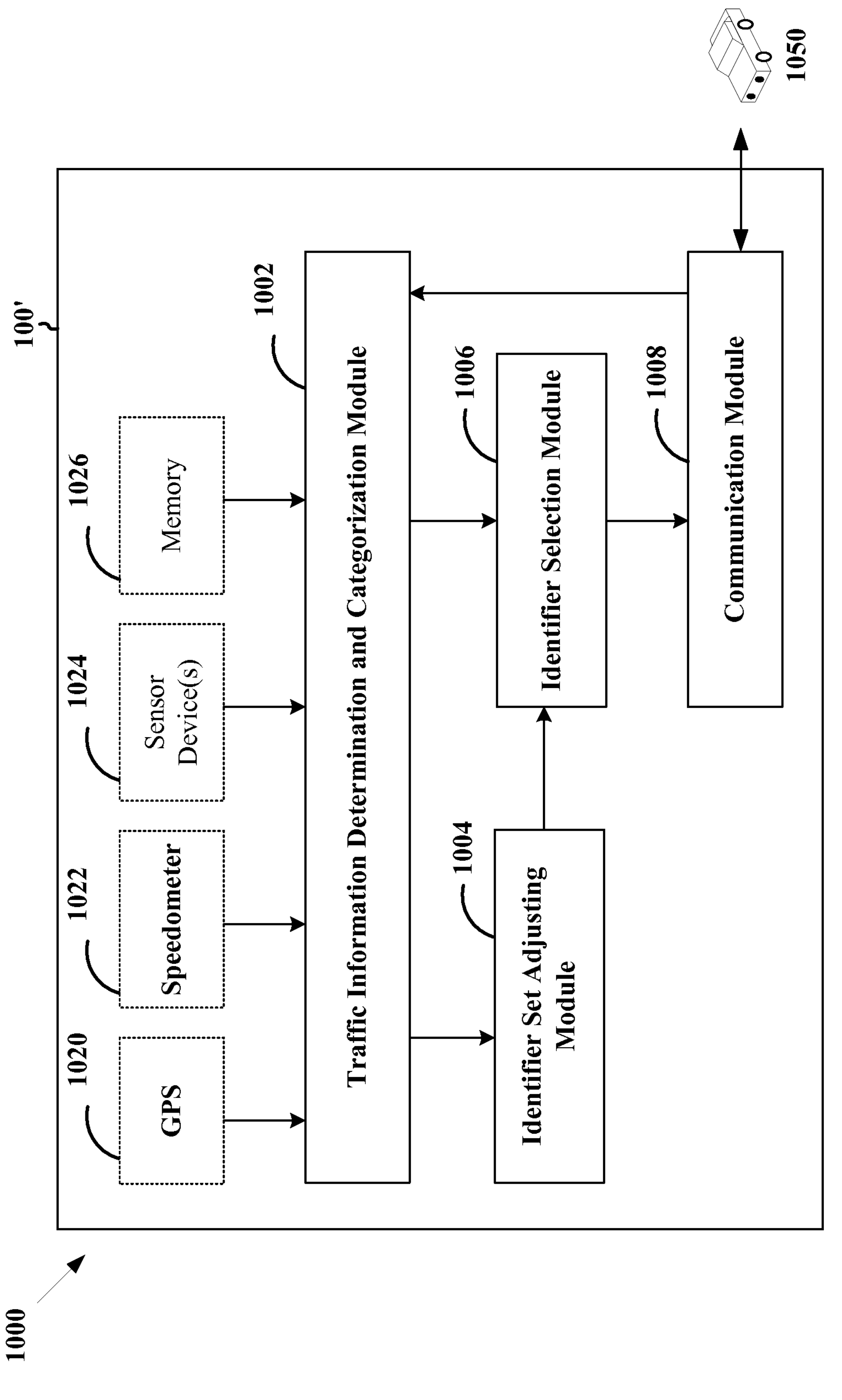
FIG. 10 is a conceptual block diagram illustrating the functionality of an exemplary apparatus.

FIG. 10 is a conceptual block diagram 1000 illustrating the functionality of an exemplary apparatus 100'. The apparatus includes a traffic information determination and categorization module 1002, an identifier set adjusting module 1004, an identifier selection module 1006, and a communication module 1008. The apparatus may include one or more of sensor devices, such as a speedometer 1022, Global Positioning System (GPS) 1020, and/or other sensor devices 1024. The apparatus may further include a memory 1026 for storing map and/or geographical information. The traffic information determination and categorization module 1002 receives input from the memory 1026, sensor devices 1020-1024, and/or other wireless devices (e.g., the wireless device 1050) through the communication module 1008, and determines and categorizes the traffic information. The identifier set adjusting module 1004 adjusts a number of sets of identifiers in a plurality of sets of identifiers based on traffic information. The identifier selection module 1006 selects an identifier from a set of identifiers of the plurality of sets of identifiers based on the traffic information. The communication module 1008 communicates with other wireless devices (e.g., the wireless device 1050) using resources associated with the selected identifier. The communication module 1008 is configured to receive traffic information from other wireless devices and provide that information to the traffic information determination and categorization module 1002.

The traffic information determination and categorization module 1002 determines the traffic information from at least one of directions of travel of wireless devices in an area, directions of travel available in an area, map information, velocity, whether approaching an intersection, whether departing an intersection, location, a number of vehicles within a particular area, information from other vehicles, type of intersection, whether the intersection includes stop lights or stop signs, at least one computed value based on acquired traffic information, information from other wireless devices, or other traffic related information. The identifier set adjusting module 1004 may adjust the sets of identifiers such that each of the sets of identifiers contains different identifiers. The identifier set adjusting module 1004 may also adjust a size of at least two of the plurality of sets of identifiers based on the traffic information.

The traffic information determination and categorization module 1002 may categorize the traffic information of a particular type of traffic information into a number of categories. The identifier set adjusting module 1004 may decrease a number of sets of identifiers in the plurality of sets of identifiers and increase a size of each of the plurality of sets of identifiers when the number of categories decreases, and may increase the number of sets of identifiers in the plurality of sets of identifiers and decrease a size of each of the plurality of sets of identifiers when the number of categories increases. The identifier selection module 1006 may select the identifier from a first set of identifiers when a traffic parameter associated with the traffic information is contained in a first set of traffic information, and may select the identifier from a second set of identifiers when a traffic parameter associated with the traffic information is contained in a second set of traffic information. In one configuration, the traffic parameter includes a direction of travel, the first set of traffic information is a first range of directions of travel, and the second set of traffic information is a second range of directions of travel. In one configuration, the first set of identifiers and the second set of identifiers include a plurality of groups of identifiers, and each group of identifiers is associated with priorities that are either greater than or less than priorities of any other group of identifiers. In such a configuration, each group of identifiers may include a subset of identifiers from the first set of identifiers and a subset of identifiers from the second set of identifiers.

The identifier selection module 1006 may reselect the identifier from the first set of identifiers when the traffic parameter changes from being contained in the second set of traffic information to the first set of traffic information, and reselect the identifier from the second set of identifiers when the traffic parameter changes from being contained in the first set of traffic information to the second set of traffic information. In such a configuration, the identifier selection module 1006 may refrain from reselecting the identifier for a time period when the traffic parameter changes from being contained in the first set of traffic information to the second set of traffic information or changes from being contained in the second set of traffic information to the first set of traffic information. The time period itself may be based on the traffic information. The identifier may be a PDRID associated with a plurality of predetermined broadcast resources. The identifier may be a CID shared with a second wireless device and associated with a plurality of predetermined unicast resources for peer-to-peer communication with the second wireless device.

The apparatus may include additional modules that perform each of the steps of the algorithm in the aforementioned flow chart FIG. 9. As such, each step in the aforementioned flow chart FIG. 9 may be performed by a module and the apparatus may include one or more of those modules. The modules may be the processing system 114, or otherwise, the same or different programmable or dedicated hardware configured to perform the functionality associated with each of the modules.

Referring to FIG. 1 and FIG. 10, in one configuration, the apparatus 100/100' for wireless communication includes means for adjusting a number of sets of identifiers in a plurality of sets of identifiers based on traffic information, means for selecting an identifier from a set of identifiers of the plurality of sets of identifiers based on the traffic information, and means for communicating using resources associated with the selected identifier. The apparatus may further include means for adjusting a size of at least two of the plurality of sets of identifiers based on the traffic information. The apparatus may further include means for categorizing the traffic information of a particular type of traffic information into a number of categories. In such a configuration, the means for adjusting is configured to decrease a number of sets of identifiers in the plurality of sets of identifiers and to increase a size of each of the plurality of sets of identifiers when the number of categories decreases. The means for adjusting is further configured to increase the number of sets of identifiers in the plurality of sets of identifiers and to decrease a size of each of the plurality of sets of identifiers when the number of categories increases.

In one configuration, the means for selecting is configured to select the identifier from a first set of identifiers when a traffic parameter associated with the traffic information is contained in a first set of traffic information, and to select the identifier from a second set of identifiers when a traffic parameter associated with the traffic information is contained in a second set of traffic information. In such a configuration, the apparatus may further include means for reselecting the identifier from the first set of identifiers when the traffic parameter changes from being contained in the second set of traffic information to the first set of traffic information, and means for reselecting the identifier from the second set of identifiers when the traffic parameter changes from being contained in the first set of traffic information to the second set of traffic information. The apparatus may further include means for refraining from reselecting the identifier for a time period when the traffic parameter changes from being contained in the first set of traffic information to the second set of traffic information or changes from being contained in the second set of traffic information to the first set of traffic information. The means may be the processor 104, the processing system 114, and/or one or more of the modules of the apparatus 100' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a first wireless device, comprising:

adjusting, by the first wireless device, a number of sets of identifiers in a plurality of sets of identifiers based on traffic information, the sets of identifiers identifying wireless communication resources for peer-to-peer communication, wherein the adjusting is performed to reduce interference in the peer-to-peer communication;

selecting, by the first wireless device, an identifier that identifies wireless resources from a set of identifiers of the plurality of sets of identifiers based on the traffic information; and communicating, by the first wireless device, with at least a second wireless device using the wireless resources identified by the selected identifier.

2. The method of claim 1, wherein traffic information comprise at least one of directions of travel of wireless devices in an area, directions of travel available in an area, map information, velocity, whether approaching an intersection, whether departing an intersection, location, a number of vehicles within a particular area, information from other vehicles, type of intersection, whether the intersection includes stop lights or stop signs, at least one computed value based on acquired traffic information, or information from other wireless devices.

3. The method of claim 1, wherein each of the sets of identifiers contains different identifiers.

4. The method of claim 1, further comprising adjusting a size of at least two of the plurality of sets of identifiers based on the traffic information.

5. The method of claim 4, further comprising categorizing the traffic information of a particular type of traffic information into a number of categories, wherein the adjusting comprises:

decreasing the number of sets of identifiers in the plurality of sets of identifiers and increasing a size of each of the plurality of sets of identifiers when the number of categories decreases; and increasing the number of sets of identifiers in the plurality of sets of identifiers and decreasing a size of each of the plurality of sets of identifiers when the number of categories increases.

6. The method of claim 1, wherein the selecting comprises:

selecting the identifier from a first set of identifiers when a traffic parameter associated with the traffic information is contained in a first set of traffic information; and selecting the identifier from a second set of identifiers when a traffic parameter associated with the traffic information is contained in a second set of traffic information.

7. The method of claim 6, wherein the traffic parameter comprises a direction of travel, the first set of traffic information is a first range of directions of travel, and the second set of traffic information is a second range of directions of travel.

8. The method of claim 6, wherein the first set of identifiers and the second set of identifiers comprise a plurality of groups of identifiers, each group of identifiers being associated with priorities that are either greater than or less than priorities of any other group of identifiers.

9. The method of claim 8, wherein each group of identifiers comprises a subset of identifiers from the first set of identifiers and a subset of identifiers from the second set of identifiers.

10. The method of claim 6, further comprising:

reselecting the identifier from the first set of identifiers when the traffic parameter changes from being contained in the second set of traffic information to the first set of traffic information; and reselecting the identifier from the second set of identifiers when the traffic parameter changes from being contained in the first set of traffic information to the second set of traffic information.

11. The method of claim 10, further comprising refraining from reselecting the identifier for a time period when the traffic parameter changes from being contained in the first set of traffic information to the second set of traffic information or changes from being contained in the second set of traffic information to the first set of traffic information.

12. The method of claim 11, wherein the time period is based on the traffic information.

13. The method of claim 1, wherein the identifier is a peer discovery resource identifier (PDRID) associated with a plurality of predetermined broadcast resources.

14. The method of claim 1, wherein the identifier is a connection identifier (CID) shared with the second wireless device and associated with a plurality of predetermined unicast resources for peer-to-peer communication with the second wireless device.

15. A first wireless device for wireless communication, comprising:

means for adjusting, by the first wireless device, a number of sets of identifiers in a plurality of sets of identifiers based on traffic information, the sets of identifiers identifying wireless communication resources for peer-to-peer communication, wherein the adjusting is performed to reduce interference in the peer-to-peer communication;

means for selecting, by the first wireless device, an identifier that identifies wireless resources from a set of identifiers of the plurality of sets of identifiers based on the traffic information; and means for communicating, by the first wireless device, with at least a second wireless device using the wireless resources identified by the selected identifier.

16. The first wireless device of claim 15, wherein traffic information comprise at least one of directions of travel of wireless devices in an area, directions of travel available in an area, map information, velocity, whether approaching an intersection, whether departing an intersection, location, a number of vehicles within a particular area, information from other vehicles, type of intersection, whether the intersection includes stop lights or stop signs, at least one computed value based on acquired traffic information, or information from other wireless devices.

17. The first wireless device of claim 15, wherein each of the sets of identifiers contains different identifiers.

18. The first wireless device of claim 15, further comprising means for adjusting a size of at least two of the plurality of sets of identifiers based on the traffic information.

19. The first wireless device of claim 18, further comprising means for categorizing the traffic information of a particular type of traffic information into a number of categories, wherein the means for adjusting is configured to:

decrease the number of sets of identifiers in the plurality of sets of identifiers and increase a size of each of the plurality of sets of identifiers when the number of categories decreases; and increase the number of sets of identifiers in the plurality of sets of identifiers and decrease a size of each of the plurality of sets of identifiers when the number of categories increases.

20. The first wireless device of claim 15, wherein the means for selecting is configured to:

select the identifier from a first set of identifiers when a traffic parameter associated with the traffic information is contained in a first set of traffic information; and select the identifier from a second set of identifiers when a traffic parameter associated with the traffic information is contained in a second set of traffic information.

21. The first wireless device of claim 20, wherein the traffic parameter comprises a direction of travel, the first set of traffic information is a first range of directions of travel, and the second set of traffic information is a second range of directions of travel.

22. The first wireless device of claim 20, wherein the first set of identifiers and the second set of identifiers comprise a plurality of groups of identifiers, each group of identifiers being associated with priorities that are either greater than or less than priorities of any other group of identifiers.

23. The first wireless device of claim 22, wherein each group of identifiers comprises a subset of identifiers from the first set of identifiers and a subset of identifiers from the second set of identifiers.

24. The first wireless device of claim 20, further comprising:

means for reselecting the identifier from the first set of identifiers when the traffic parameter changes from being contained in the second set of traffic information to the first set of traffic information; and means for reselecting the identifier from the second set of identifiers when the traffic parameter changes from being contained in the first set of traffic information to the second set of traffic information.

25. The first wireless device of claim 24, further comprising means for refraining from reselecting the identifier for a time period when the traffic parameter changes from being contained in the first set of traffic information to the second set of traffic information or changes from being contained in the second set of traffic information to the first set of traffic information.

26. The first wireless device of claim 25, wherein the time period is based on the traffic information.

27. The first wireless device of claim 15, wherein the identifier is a peer discovery resource identifier (PDRID) associated with a plurality of predetermined broadcast resources.

28. The first wireless device of claim 15, wherein the identifier is a connection identifier (CID) shared with the second wireless device and associated with a plurality of predetermined unicast resources for peer-to-peer communication with the second wireless device.

29. A first wireless device for wireless communication, comprising:

a processing system configured to:

adjust, by the first wireless device, a number of sets of identifiers in a plurality of sets of identifiers based on traffic information, the sets of identifiers identifying wireless communication resources for peer-to-peer communication, wherein the adjusting is performed to reduce interference in the peer-to-peer communication;

select, by the first wireless device, an identifier that identifies wireless resources from a set of identifiers of the plurality of sets of identifiers based on the traffic information; and communicate, by the first wireless device, with at least a second wireless device using the wireless resources identified by the selected identifier.

30. The first wireless device of claim 29, wherein traffic information comprise at least one of directions of travel of wireless devices in an area, directions of travel available in an area, map information, velocity, whether approaching an intersection, whether departing an intersection, location, a number of vehicles within a particular area, information from other vehicles, type of intersection, whether the intersection includes stop lights or stop signs, at least one computed value based on acquired traffic information, or information from other wireless devices.

31. The first wireless device of claim 29, wherein each of the sets of identifiers contains different identifiers.

32. The first wireless device of claim 29, wherein the processing system is further configured to adjust a size of at least two of the plurality of sets of identifiers based on the traffic information.

33. The first wireless device of claim 32, wherein the processing system is further configured to categorize the traffic information of a particular type of traffic information into a number of categories, wherein to adjust the number of sets of identifiers, the processing system is configured to:

decrease the number of sets of identifiers in the plurality of sets of identifiers and increase a size of each of the plurality of sets of identifiers when the number of categories decreases; and increase the number of sets of identifiers in the plurality of sets of identifiers and decrease a size of each of the plurality of sets of identifiers when the number of categories increases.

34. The first wireless device of claim 29, wherein to select the identifier, the processing system is configured to:

select the identifier from a first set of identifiers when a traffic parameter associated with the traffic information is contained in a first set of traffic information; and select the identifier from a second set of identifiers when a traffic parameter associated with the traffic information is contained in a second set of traffic information.

35. The first wireless device of claim 34, wherein the traffic parameter comprises a direction of travel, the first set of traffic information is a first range of directions of travel, and the second set of traffic information is a second range of directions of travel.

36. The first wireless device of claim 34, wherein the first set of identifiers and the second set of identifiers comprise a plurality of groups of identifiers, each group of identifiers being associated with priorities that are either greater than or less than priorities of any other group of identifiers.

37. The first wireless device of claim 36, wherein each group of identifiers comprises a subset of identifiers from the first set of identifiers and a subset of identifiers from the second set of identifiers.

38. The first wireless device of claim 34, wherein the processing system is further configured to:

reselect the identifier from the first set of identifiers when the traffic parameter changes from being contained in the second set of traffic information to the first set of traffic information; and reselect the identifier from the second set of identifiers when the traffic parameter changes from being contained in the first set of traffic information to the second set of traffic information.

39. The first wireless device of claim 38, wherein the processing system is further configured to refrain from reselecting the identifier for a time period when the traffic parameter changes from being contained in the first set of traffic information to the second set of traffic information or changes from being contained in the second set of traffic information to the first set of traffic information.

40. The first wireless device of claim 39, wherein the time period is based on the traffic information.

41. The first wireless device of claim 29, wherein the identifier is a peer discovery resource identifier (PDRID) associated with a plurality of predetermined broadcast resources.

42. The first wireless device of claim 29, wherein the identifier is a connection identifier (CID) shared with the second wireless device and associated with a plurality of predetermined unicast resources for peer-to-peer communication with the second wireless device.

43. A non-transitory computer-readable medium of a first wireless device storing computer executable code which when executed by at least one processor causes the at least one processor to: adjust, by the first wireless device, a number of sets of identifiers in a plurality of sets of identifiers based on traffic information, the sets of identifiers identifying wireless communication resources for peer-to-peer communication, wherein the adjusting is performed to reduce interference in the peer-to-peer communication; select, by the first wireless device, an identifier that identifies wireless resources from a set of identifiers of the plurality of sets of identifiers based on the traffic information; and communicate, by the first wireless device, with at least a second wireless device using the wireless resources identified by the selected identifier.

* * * * *